(12) United States Patent
Shukuya

(10) Patent No.: US 8,902,463 B2
(45) Date of Patent: Dec. 2, 2014

(54) IMAGE FORMING APPARATUS WHICH CALCULATES AND CORRECTS SKEW ERROR

(71) Applicant: Yuichiro Shukuya, Kanagawa (JP)

(72) Inventor: Yuichiro Shukuya, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 171 days.

(21) Appl. No.: 13/626,446

(22) Filed: Sep. 25, 2012

(65) Prior Publication Data

US 2013/0107286 A1 May 2, 2013

(30) Foreign Application Priority Data

Oct. 31, 2011 (JP) ................... 2011-239495

(51) Int. Cl.
G06K 1/00 (2006.01)
(52) U.S. Cl.
CPC ........................ G06K 1/00 (2013.01)
USPC ............................ 358/1.5; 358/1.12; 347/236
(58) Field of Classification Search
USPC .................... 358/1.5, 1.12; 347/236
See application file for complete search history.

(56) References Cited

U.S. PATENT DOCUMENTS

| | | | |
|---|---|---|---|
| 2005/0200689 A1* | 9/2005 | Shinohara et al. | ............ 347/116 |
| 2007/0122210 A1 | 5/2007 | Sato et al. | |
| 2007/0140721 A1 | 6/2007 | Shinohara et al. | |
| 2008/0144063 A1* | 6/2008 | Ernst et al. | .................... 358/1.12 |
| 2008/0174799 A1 | 7/2008 | Higashiyama et al. | |
| 2011/0043588 A1 | 2/2011 | Shukuya | |
| 2011/0043592 A1* | 2/2011 | Kinoshita et al. | ............. 347/236 |
| 2011/0205324 A1 | 8/2011 | Shukuya | |

FOREIGN PATENT DOCUMENTS

| | | |
|---|---|---|
| JP | 2007-148296 | 6/2007 |
| JP | 2007-155750 | 6/2007 |
| JP | 2007-155766 | 6/2007 |
| JP | 2009-027683 | 2/2009 |
| JP | 2009-069437 | 4/2009 |
| JP | 2009-075155 | 4/2009 |
| JP | 2010-026171 | 2/2010 |
| JP | 2011-043566 | 3/2011 |
| JP | 2011-170149 | 9/2011 |

* cited by examiner

Primary Examiner — Qian Yang
(74) Attorney, Agent, or Firm — Oblon, Spivak, McClelland, Maier & Neustadt, L.L.P.

(57) ABSTRACT

An image forming apparatus includes: Photoreceptors; an image carrier; a plurality of light emitting element arrays each configured to emit a light beam to a corresponding one of the photoreceptors independently; an angle adjustment unit to adjust a mounting angle of the light emitting element arrays to a frame of the image forming apparatus; a pattern forming unit to form a positional error correction pattern of each color on the image carrier; a optical detector to detect the correction pattern formed on the image carrier; a positional error calculation unit to calculate a printing skew error and a main scanning scaling error of the light emitting element arrays based on the correction pattern detected by the optical detector; a skew correction unit to correct the printing skew error detected by the positional error calculation unit; and further a main scanning scaling error correction unit.

5 Claims, 15 Drawing Sheets

FIG. 6-1A
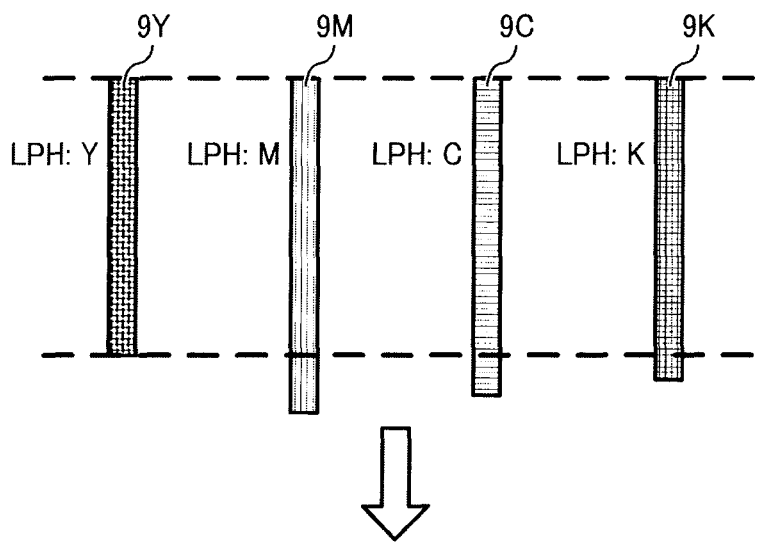
FIG. 6-1B
FIG. 6-2
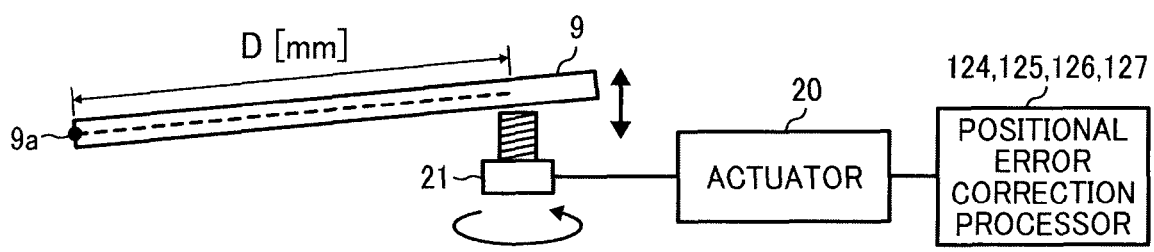

BEYOND CORRECTABLE RANGE

SKEW CORRECTION IMAGE

LINE MEMORY IMAGE

MEMORY AREA NOT SECURED

IMAGE REDUCTION PROCESS

LINE MEMORY IMAGE

REDUCE CAPACITY OF LINE MEMORY AND INCREASE NUMBER OF LINE MEMORIES

WITHIN CORRECTABLE RANGE

BEYOND CORRECTABLE RANGE

IMAGE REDUCTION PROCESS

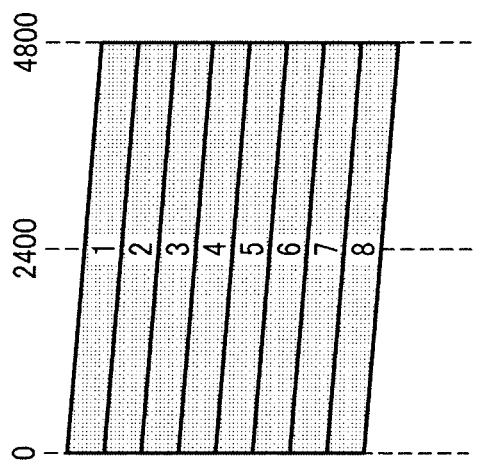
FIG. 11-1A
FIG. 11-1B
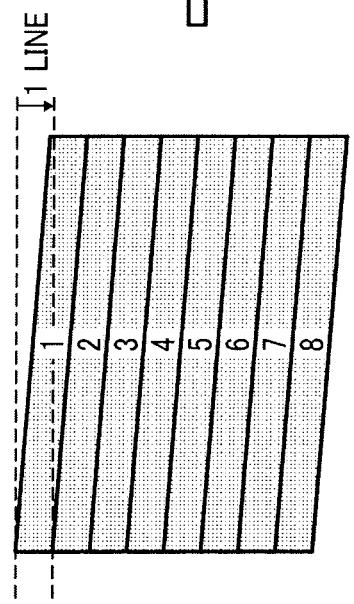
FIG. 11-1C
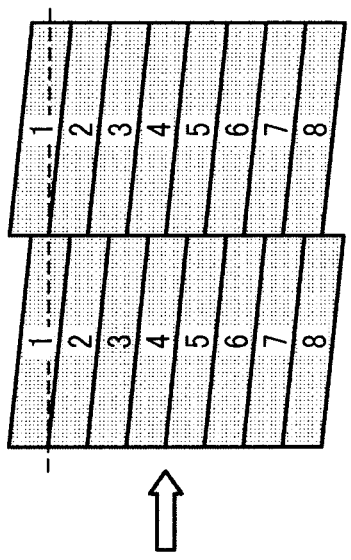

IMAGE FORMING APPARATUS WHICH CALCULATES AND CORRECTS SKEW ERROR

CROSS-REFERENCE TO RELATED APPLICATION

The present application claims priority from Japanese patent application number 2011-239495, filed on Oct. 31, 2011, the entire contents of which are incorporated by reference herein.

BACKGROUND OF THE INVENTION

1. Field of the Invention

The present invention relates to an image forming apparatus in which a plurality of images are formed on an image carrier in a superposed manner to form a full-color image and the image formed on the image carrier is transferred to a paper medium, and in particular, relates to an image forming apparatus capable of correcting a color shift of an image forming unit when the above image forming process is performed.

2. Description of the Related Art

Conventionally, due to an acute demand for a color image forming apparatus capable of printing images at a higher speed, a color image forming method which is called a tandem method has become the main type of the high speed image forming apparatus, in which electrostatic latent image forming units for four colors of CMYK are arranged in parallel. In the tandem method, due to its structure, accurate positional alignment between images of different colors is essential.

Accordingly, in the tandem-type color image forming apparatus, predetermined toner patterns of respective colors of toner are formed on a transfer belt, the toner patterns are detected by an optical sensor, color shift amounts between respective colors in main and sub-scanning directions, scaling errors in the main scanning direction, and skew are calculated based on each factor, and feedback correction is performed, thereby reducing the color shift.

In addition, this correction process is performed when the power is turned on, when any environmental change such as a change in temperature occurs, or when a number of sheets exceeding a predetermined number have been printed, thereby keeping the color shift amount within a predetermined range. Among color shift amounts, registration error in the main and sub-scanning directions can be corrected by adjusting emission timing of laser beams that scan a photoreceptor and the main scanning scaling can be corrected digitally by adjusting a pixel clock.

JP-2003-285473-A discloses a method of reducing the skew by an imaging process by deforming an output image in an inverse direction. The method to correct the skew by the imaging process includes storing part of the image in a line memory and reading the stored image switching a read-out position, thereby correcting the skew between colors. In this method, it may be enough to add a line memory to an image processor in accordance with the to-be-corrected range, and therefore, can be achieved at a relatively low cost compared to a mechanical correction.

As described above, the main scanning scaling can be digitally processed by adjusting the pixel clock. However, light emitting elements of each color disposed on the photoreceptor have different lengths, because the main scanning scaling is different originally, the processing frequency required for correction of the main scanning scaling error is excessive. Accordingly, light emitting elements having the same length has come to be used, but the length of all the light emitting elements needs to be adjusted, thereby increasing the cost for maintenance.

BRIEF SUMMARY OF THE INVENTION

The present invention provides an image forming apparatus capable of effectively performing the positional error correction even when light emitting elements having different lengths are used.

More specifically, the present invention provides an image forming apparatus including: photoreceptors; an image carrier; a plurality of light emitting element arrays each configured to emit a light beam onto a corresponding one of the photoreceptors independently; an angle adjuster to adjust a mounting angle of the light emitting element arrays to a frame of the image forming apparatus; a pattern generator to form a positional error correction pattern of each color on the image carrier; an optical detector to detect the correction pattern formed on the image carrier; a positional error calculator to calculate a printing skew error and a main scanning scaling error of the light emitting element arrays based on the correction pattern detected by the optical detector; and a skew corrector to correct the printing skew error detected by the positional error calculator.

According to the present invention, even when the light emitting element arrays with different length are used, the positional error correction can be adequately performed.

These and other objects, features, and advantages of the present invention will become more readily apparent upon consideration of the following description of the preferred embodiments of the present invention when taken in conjunction with the accompanying drawings.

BRIEF DESCRIPTION OF THE DRAWINGS

FIGS. 6-1A and 6-1B are schematic views illustrating how to mount a light emitting element array;

FIG. 6-2 is a schematic view illustrating a structure of a working part configured to tilt the light emitting element array;

FIG. 8-1 shows a line memory storage when the skew amount is within a predetermined correction range and FIG. 8-2 shows a line memory storage when the skew amount is beyond the predetermined correction range;

FIGS. 11-1A to 11-1C are views illustrating a skew correction when a skew correction amount is one dot and FIGS. 11-2A to 11-2C are views illustrating a skew correction when a skew correction amount is three dots;

DETAILED DESCRIPTION OF THE INVENTION

Preferred embodiments of a color image forming apparatus according to the present invention will now be described in detail with reference to the accompanying drawings.

A structure and operation of an image forming apparatus according to one embodiment of the present invention will now be described.

Figure 1:
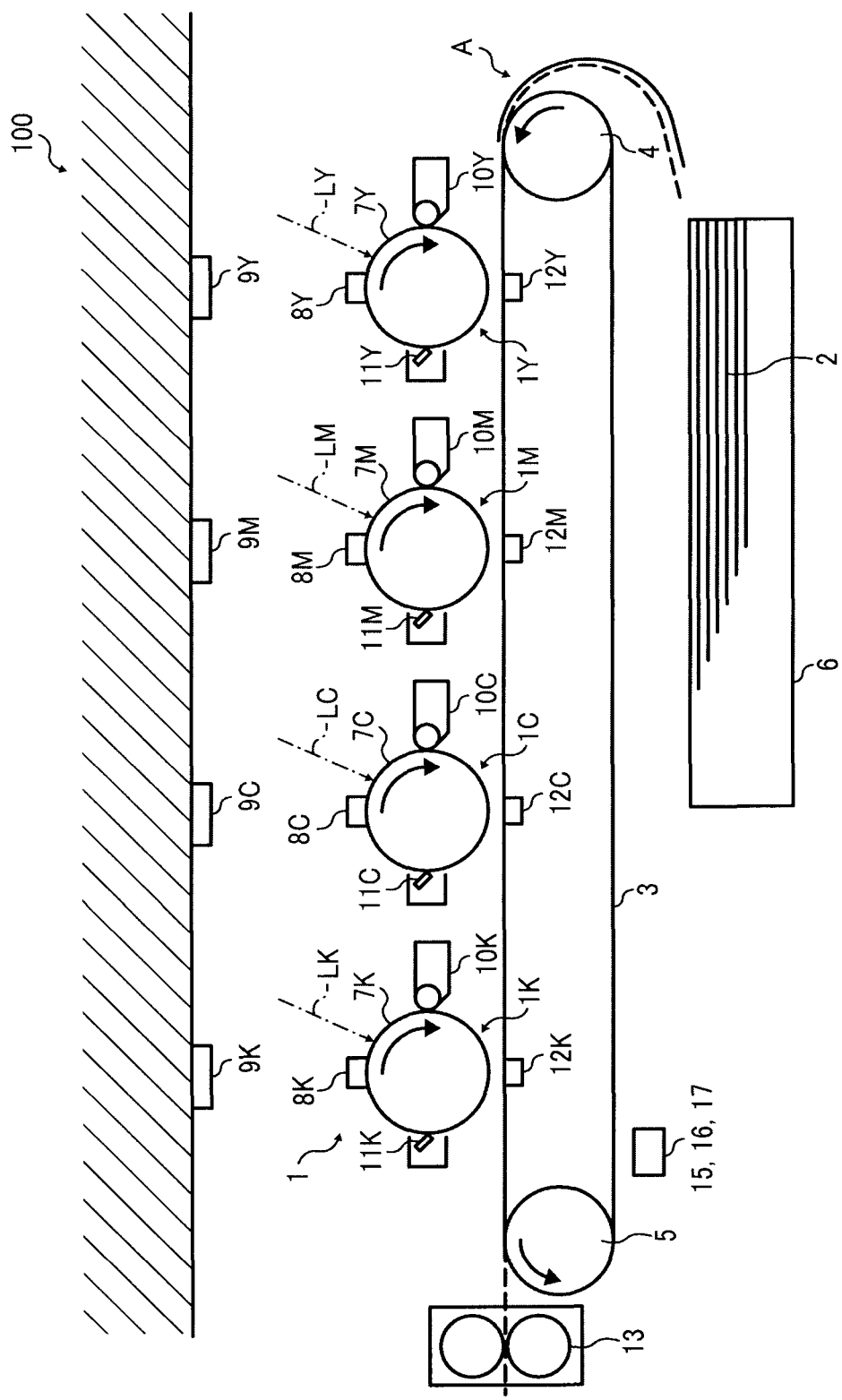
FIG. 1 is a front view of image forming units and a transfer belt illustrating a principle of image formation by a color image forming apparatus.

FIG. 1 is a front view of image forming units and a transfer belt illustrating a principle of image formation by a color image forming apparatus 100, which forms an image on a transfer medium by an electrophotographic method. As illustrated in FIG. 1, the image forming apparatus 100 includes photoreceptors 7K, 7M, 7C, and 7Y; image processing units 1K, 1M, 1C, and 1Y; and an intermediate transfer belt 3. Each suffix of K, M, C, and Y represents a color of black, magenta, cyan, and yellow. The image forming apparatus 100 forms an electrostatic latent image on each photoreceptor, and thereafter, each image processing unit disposed in line along the intermediate transfer belt 3 forms a toner image of different colors; i.e., black (K), magenta (M), cyan (C), or yellow (Y).

A first image processing unit 1Y includes the photoreceptor 7Y, a charger 8Y disposed around the photoreceptor 7Y, a light emitting element array 9Y disposed above the photoreceptor 7Y, a developing device 10Y, and a photoreceptor cleaner 11Y. The light emitting element array 9Y is implemented as an LED Printer Head (LPH) as a module to include in combination, for example, an optical lens to optically scale a light emitted from a light source such as a light-emitting diode (LED); and a LD controller 109 (see FIG. 3) to control lighting power of the LED.

A surface of the photoreceptor 7Y is uniformly charged by the charger 8Y and is exposed by laser beams LY corresponding to a yellow image by the light emitting element array 9Y, and an electrostatic latent image is formed on the surface thereof. The electrostatic latent image thus formed is developed by the developing device 10Y including yellow toner (not shown), and a yellow toner image is formed on the photoreceptor 7Y.

Similarly, each of a second image processing unit 1M, a third image processing unit 1C, and a fourth image processing unit 1K positioned on the left of the first image processing unit 1Y is uniformly charged by each charger 8M, 8C, or 8K and is exposed by laser beams LM, LC, or LK corresponding to each color image, and an electrostatic latent image is formed on each surface of the photoreceptor. Each of the electrostatic latent images thus formed is developed by the developing device 10M, 10C, or 10K including each color toner (not shown), and a magenta toner image, a cyan toner image, and a black toner image are respectively formed on the photoreceptors 7M, 7C, and 7K.

The intermediate transfer belt 3 as an image carrier is entrained around a belt drive roller 4 to exert a driving force and a driven roller 5, and is rotated in an arrow direction in FIG. 1 by a rotation of the drive roller 4. Accordingly, after the yellow toner image formed on the photoreceptor 7Y is primarily transferred to the intermediate transfer belt 3 by a transfer device 12Y, the magenta toner image formed on the photoreceptor 7M, the cyan toner image formed on the photoreceptor 7C, and the black toner image formed on the photoreceptor 7K are sequentially and primarily transferred to the intermediate transfer belt 3 by the corresponding transfer device 12M, 12C, and 12K. Thus, a 4-color toner image superposed from bottom to top on the intermediate transfer belt 3 in the order YMCK is formed.

An uppermost transfer sheet 2 in a sheet feed tray 6 is conveyed to a secondary transfer position A at which the transfer sheet 2 contacts the intermediate transfer belt 3 and the 4-color toner image is transferred from the intermediate transfer belt 3 to the transfer sheet 2. The transfer sheet 2 on which the 4-color toner image is formed is then separated from the intermediate transfer belt 3 and is further conveyed to a fixing position, at which the 4-color toner image on the transfer sheet 2 is fixed onto the transfer sheet 2 with heat and pressure by a fixing device 13. The transfer sheet 2 is then discharged to outside the image forming apparatus 100. As illustrated in FIG. 1, a left-side pattern detection sensor 15, a right-side pattern detection sensor 16, and a central pattern detection sensor 17 are disposed at the left below of the intermediate transfer belt 3. The pattern detection sensors 15, 16, and 16 detect patterns 14 for positional error correction (see FIG. 2).

After the toner image on the photoreceptor 7Y has been transferred to the intermediate transfer belt 3, excess toner remaining on the photoreceptor 7Y is cleaned by the photoreceptor cleaner 11Y, and the photoreceptor 7Y is ready for a next electrostatic latent image formation. In addition, the excess toner remaining on other photoreceptors 7M, 7C, and 7K is similarly cleaned by the photoreceptor cleaners 11M, 11C, and 11K, respectively, and each photoreceptor is ready for a next electrostatic latent image formation. In a case of the tandem-type image forming apparatus 100, positional errors of the image of four process colors may cause a critical problem. Accordingly, the positional error correction of the image is crucial.

Figure 2:
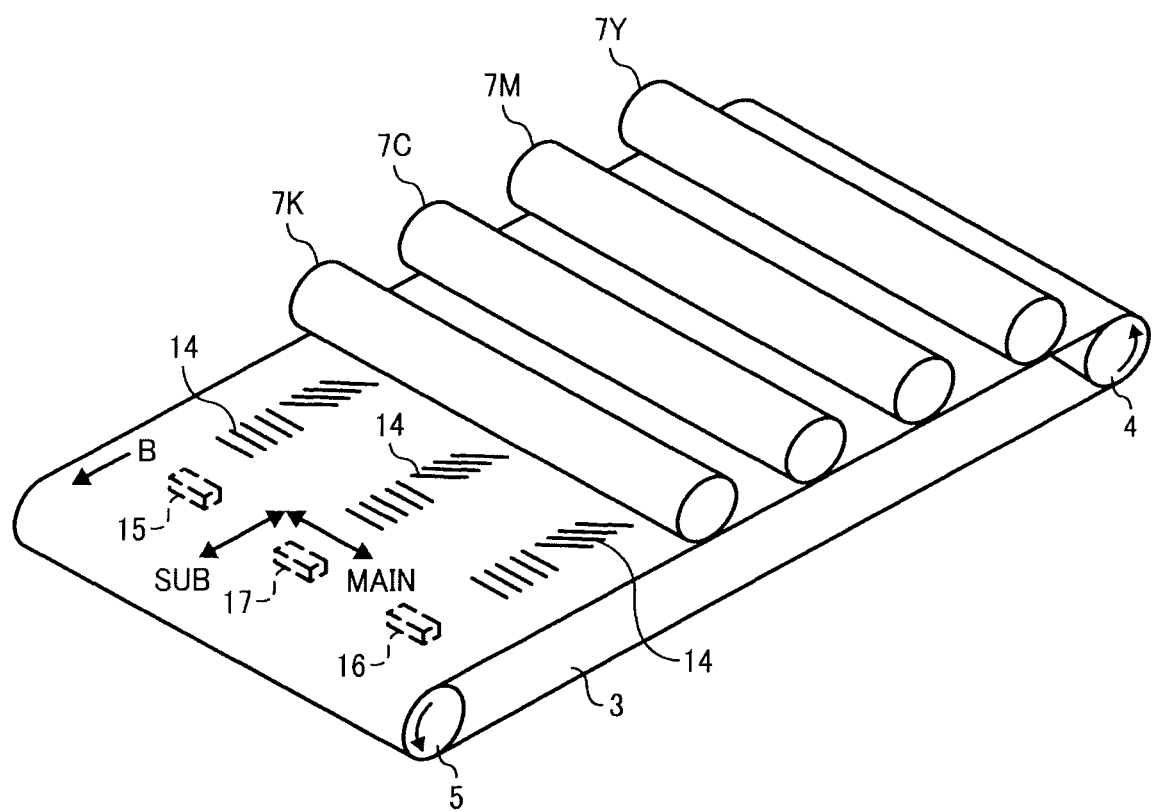
FIG. 2 is an oblique view illustrating a general structure around an intermediate transfer belt of the image forming apparatus.

A structure in which the positional error correction pattern is formed on the intermediate transfer belt will now be described. FIG. 2 is an oblique view illustrating a general structure around the intermediate transfer belt of the image forming apparatus 100 according to an embodiment of the present invention. In FIG. 2, any element which is identical to that in FIG. 1 is applied with a same reference numeral, and a description thereof will be omitted. As illustrated in FIG. 2, the positional error correction pattern 14 is formed on the intermediate transfer belt 3 in a manner similar to the aforementioned 4-color toner image forming process. Three identical positional error correction patterns 14 are formed in a direction perpendicular to a driving direction (as indicated by an arrow B in the figure) of the intermediate transfer belt 3. The left-side pattern detection sensor 15 is disposed below the intermediate transfer belt 3 at a position to read the positional error correction pattern 14 positioned at a backside. The right-side pattern detection sensor 16 is disposed below the intermediate transfer belt 3 at a position to read the positional error correction pattern 14 positioned at a front side. The central pattern detection sensor 17 is disposed below the intermediate transfer belt 3 at a position to read the positional error correction pattern 17 positioned at a center.

Figure 3:
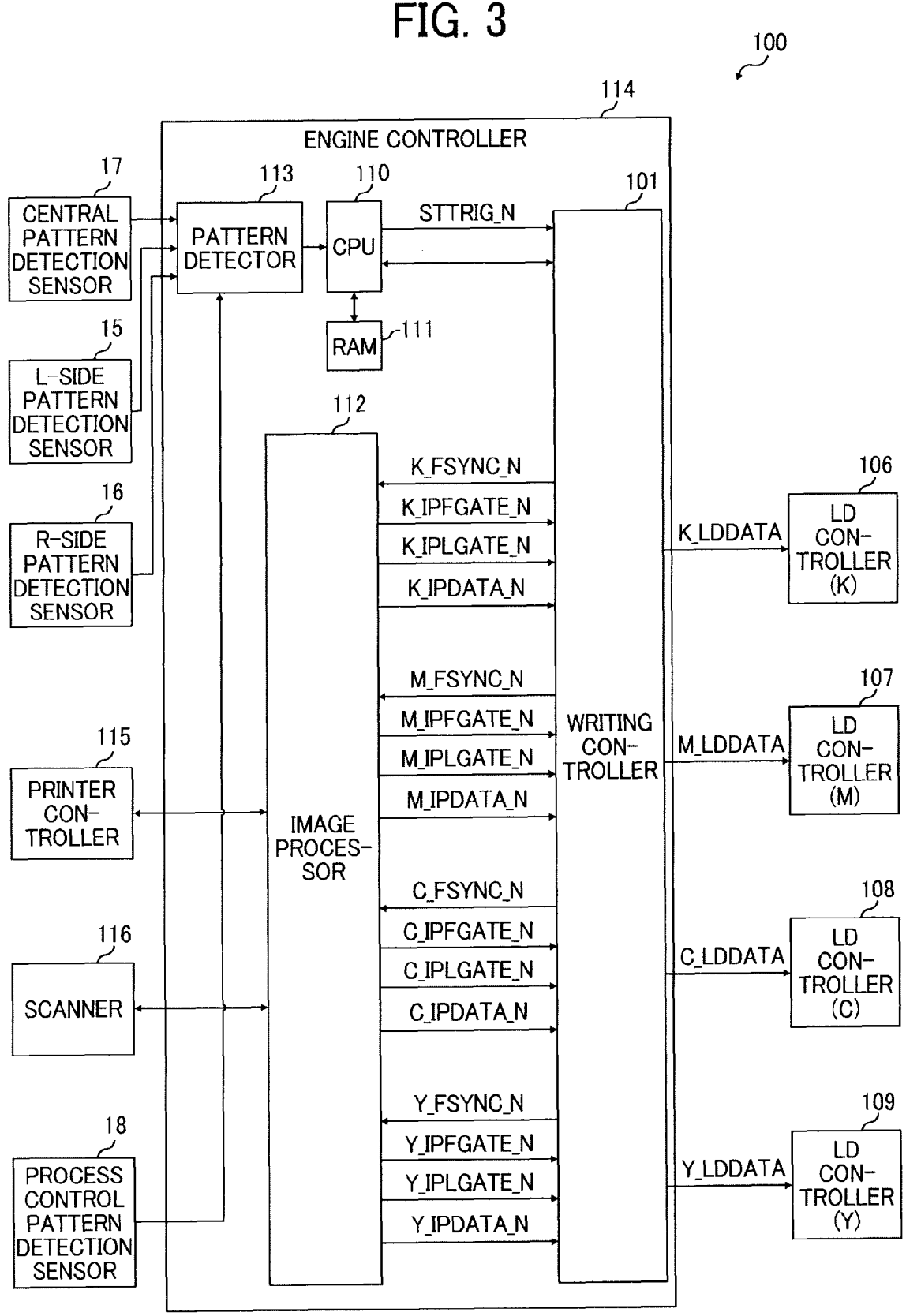
FIG. 3 is a block diagram of the image forming apparatus.

A block diagram related to controlling operation of the image forming apparatus 100 will now be described. FIG. 3 is a block diagram of the image forming apparatus according to an embodiment of the present invention. The image forming apparatus 100 includes pattern detection sensors 15, 16, and 17; a process control pattern detection sensor 18; a printer controller 115; a scanner 116; an engine controller 114; and LD controllers 106, 107, 108, and 109 for the colors of KMCY, respectively.

The engine controller 114 is a part to cause the light emitting element arrays 9 to generate image signals to expose on the photoreceptor and includes a pattern detector 113, a CPU 110, a RAM 111, an image processor 112, and a writing controller 101. The writing controller 101 is connected to the LD controllers 106, 107, 108, and 109 for the colors of KMCY. The LD controllers 106, 107, 108, and 109 control the light emitting element arrays 9Y to 9K, respectively.

The image processor 112 receives a sub-scan timing signal of each color (K, M, C, Y)_FSYNC_N sent from the writing controller 101 and sends a main scan synchronization signal of each color (K, M, C, Y)_IPLGATE_N, a sub-scan synchronization signal of each color (K, M, C, Y)_IPFGATE_N, and an image signal (K, M, C, Y)_IPDATA_N accompanied by those synchronization signals to the writing controller 101. Further, the writing controller 101 generates an image signal (K, M, C, Y)_LDDATA from the three signals and sends it to each of the LD controllers 106, 107, 108, and 109.

The signals detected by the left-side pattern detection sensor 15, the right-side pattern detection sensor 16, and the central pattern detection sensor 17 are sent to the pattern detector 113, which performs analog-to-digital conversion with respect to the detected signals. The CPU 110 calculates a positional error amount and a positional error correction amount based on the positional error amount. The calculated data is stored in the RAM 111. Further, the CPU 110 controls all operations and calculations performed inside the image forming apparatus 100.

The process control pattern detection sensor 18 obtains color gradation data from the detection pattern of each color formed on the intermediate transfer belt 3, and the CPU 110 changes process conditions such as charging, development, and transfer based on the obtained data.

Image signals sent from the printer controller 115 or the scanner 116 are subjected to imaging process by the image processor 112. The image processor 112 converts image data to arbitrary particular format, performs gradation conversion such as y-conversion, and rearranges image data corresponding to each property of the light emitting element arrays 9Y to 9K.

Figure 4:
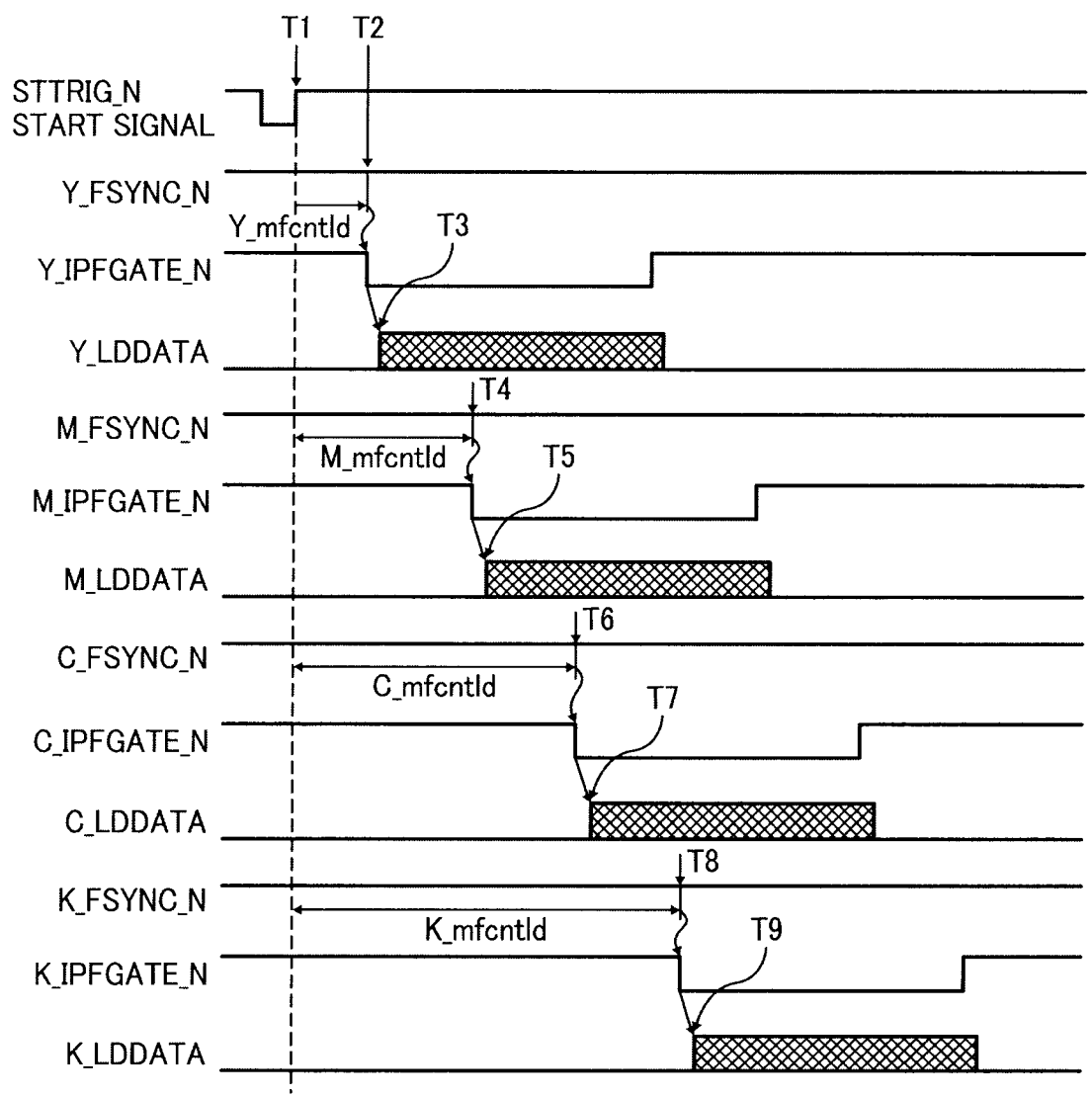
FIG. 4 is a timing chart for correcting writing timing by a writing controller in a sub-scanning direction.

The writing controller 101 controls exposure of the light emitting element array 9. FIG. 4 is a timing chart for correcting a writing timing in a sub-scanning direction by the writing controller 101 according to an embodiment of the present invention. As illustrated in FIG. 4, with a start signal STTRIG_N from the CPU 110 set as a reference, the writing controller 101 outputs a sub-scan timing signal K_FSYNC_N, M_FSYNC_N, C_FSYNC_N, and Y_FSYNC_N to the image processor 112 (see T1). Upon receipt of the sub-scan timing signal Y_FSYNC_N set as a trigger, a Y-color sub-scan synchronization signal Y_IPFGATE_N sent from the image processor 112 is received with a sub-scan delay amount Y_mfcntld from the start signal (T2). Then, an image signal Y_LDDATA is sent to the LD controller 109 for Y-color (T3). Similarly for the M-color, C-color, and K-color, the image processor 112 sends each color sub-scan synchronization signal (M, C, K)_IPFGATE_N is received (T4, T6, and T8) with a sub-scan delay amount (M, C, K)_mfcntld, the image signal (M, C, K)_LDDATA is sent to each LD controller 106, 107, or 108 (T5, T7, and T9).

Figure 5:
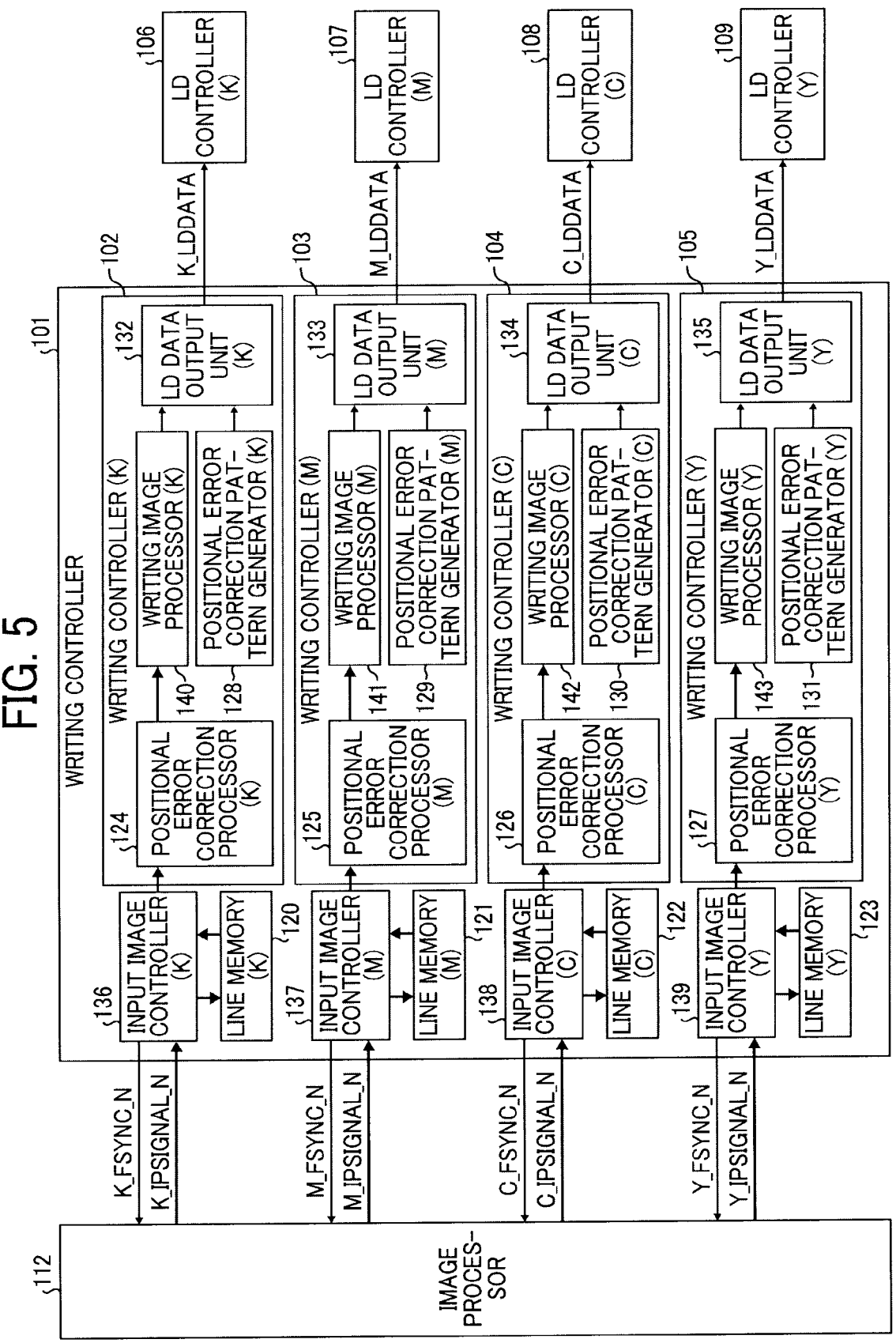
FIG. 5 is a block diagram of the writing controller inside the image forming apparatus.

The writing controller 101 will now be described in detail. FIG. 5 is a detailed block diagram of the writing controller 101 inside the image forming apparatus 100 according to an embodiment of the present invention. The writing controller 101 includes input image controllers 136, 137, 138, and 139 for each color of KMCY; line memories 120, 121, 122, and 123 for each color of KMCY; and writing controllers 102, 103, 104, and 105 for each color of KMCY.

The writing controller 102 for K-color further includes a positional error correction processor 124, a writing image controller 140, a positional error correction pattern generator 128, and an LD data output unit 132.

The writing controller 103 for M-color further includes a positional error correction processor 125, a writing image controller 141, a positional error correction pattern generator 129, and an LD data output unit 133.

The writing controller 104 for C-color further includes a positional error correction processor 126, a writing image controller 142, a positional error correction pattern generator 130, and an LD data output unit 134.

The writing controller 105 for Y-color further includes a positional error correction processor 127, a writing image controller 143, a positional error correction pattern generator 131, and an LD data output unit 135.

In FIG. 5, for simplicity, three signals, the main scan synchronization signal of each color (K, M, C, Y)_IPLGATE_N, the sub-scan synchronization signal of each color (K, M, C, Y)_IPFGATE_N, and the image signal (K, M, C, Y)_IPDATA_N accompanied by those synchronization signals described referring to FIG. 3, are combined and represented as a single writing control signal (K, M, C, Y)_IPSIGNAL_N.

As illustrated in FIG. 5, the writing control signal K_IPSIGNAL_N is sent from the image processor 112 to the input image controller 136 upon receipt of the sub-scan timing signal K_FSYNC_N from the image processor 112 set as a trigger. The input image controller 136 temporarily stores the image signal in the line memory 120 and sends the image signal to the writing controller 102. In the writing controller 102, the writing image controller 140 sends the image signal that the input image controller 136 has sent to the LD data output unit 132. The LD data output unit 132 generates a K-color writing image signal K_LDDATA and sends the same to the LD controller 106.

Similarly, as to the M-, C-, and Y-color, each input image controller 137, 138, or 139 temporarily stores the image signal in each line memory 121, 122, or 123 for the positional error amount correction based on the positional error correction amount stored in the RAM 111. The positional error correction processor 125, 126, 127, or 128 performs positional error amount correction process to the temporarily stored image signal by the positional error correction amount, and sends the image signal to each writing image controller 141, 142, or 143. Similar to the operation for K-color, the LD data output unit of each color receiving the image signal from the writing image controller for each color generates a writing image signal (M, C, Y)_LDDATA and sends the same to the LD controller 107, 108, or 109, respectively. The positional error correction amount will be described later in detail.

Further, when outputting the positional error correction pattern 14, each of the positional error correction pattern generators 128, 129, 130, and 131 sends each color pattern image signal to each of the LD data output units 132, 133, 134, and 135.

Referring now to FIGS. 6-1 and 6-2, how to mount the light emitting element arrays 9K to 9Y will now be described. FIGS. 6-1A and 6-1B each are a schematic view seen from the bottom of the image forming apparatus 100 to which the light emitting element arrays 9K to 9Y are mounted. The vertical direction in the figure corresponds to the main scanning direction and the lateral direction corresponds to the sub-scanning direction.

FIG. 6-1A shows a case in which the light emitting element arrays 9K to 9Y are mounted parallel to each other. Each of the light emitting element arrays 9K to 9Y includes a plurality of LEDs disposed in a row, and an LED corresponds to one dot. Accordingly, if the number of LEDs is different and a length in the main scanning direction of each of the light emitting element arrays 9K to 9Y differs, the difference in the length directly causes main scanning scaling error. Because the main scanning scale for each of the light emitting element arrays 9K to 9Y differs, the main scanning scaling error occurs in printing.

In the present invention, a mechanism to adjust a mounting angle of the light emitting element arrays 9K to 9Y is provided. By use of this mechanism, the main scanning scale of each of the light emitting element arrays 9K to 9Y can be the same as that illustrated in FIG. 6-1B. The Y-color light emitting element array 9Y having a shortest main scanning length is used as a reference.

Specifically, as illustrated in FIG. 6-2 as an exemplary structure of adjusting the angle, an end 9a of the light emitting element array 9 is fixed and the light emitting element array 9 is so configured as to be rotatable in the sub-scanning direction about the end 9a. Although this rotatable operation can be performed manually in the maintenance of the machine, the slanted angle of the light emitting element array 9 can be adjusted through a reciprocal movement of an action part 21 connected to an actuator 20. The actuator 20 is connected to each of the positional error correction processors 124 to 127 and corrects the main scanning scale based on the correction amount of the main scanning scaling error obtained by each of the positional error correction processors 124 to 127. In the correction operation, a reference of the correction may be set to the K-color. Alternatively, a method may be adopted in which a length in the main scanning direction of a sheet for printing is obtained, the length of the sheet is set as a reference, and correction is performed.

Figure 7:
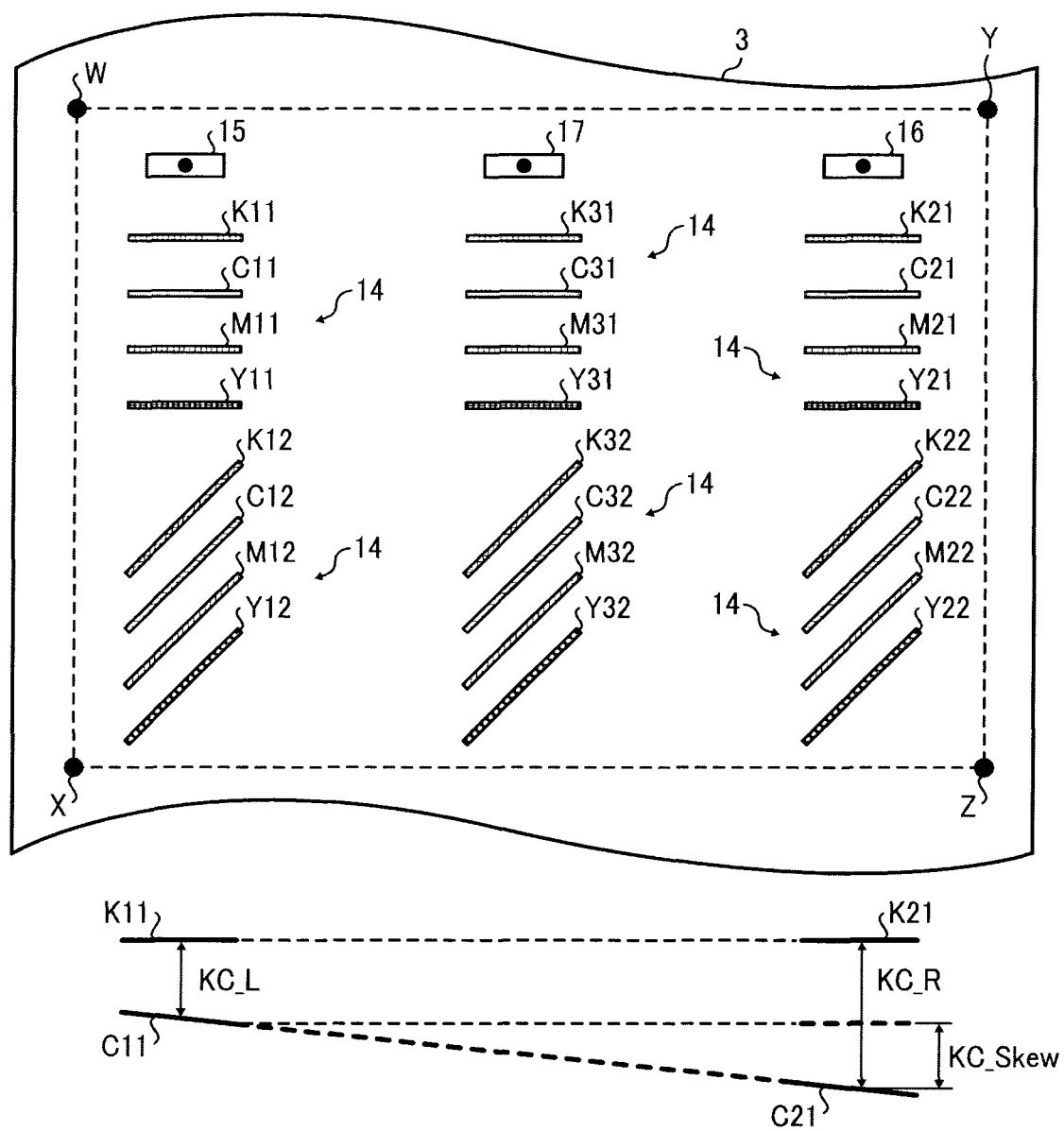
FIG. 7 is a diagram showing a structure of color shift correction patterns and skew amount calculation.

The positional error amount will now be described in detail. FIG. 7 is a diagram showing a structure of color shift correction patterns and skew amount calculation in an embodiment of the present invention. Examples of elements of the positional error amount in the image forming apparatus 100 includes a main scanning registration error, a sub-scanning registration error, a main scanning scaling error, and a printing skew error of each KMCY-color image. The main scanning registration error and the sub-scanning registration error represent a start position W in the main scanning direction and a start position X in the sub-scanning direction where the light emitting element array 9 forms an electrostatic latent image on the photoreceptors 7K, 7M, 7C and 7Y. The main scanning scaling error represents an end position Y in the main scanning direction where the light emitting element array 9 forms an electrostatic latent image on the photoreceptors 7K, 7M, 7C, and 7Y.

Specifically, if the three feature values of the main scanning registration error, the sub-scanning registration error and the main scanning scaling error are properly corrected, relative positions of a leading end area W-Y and a one-side area W-X are correctly output. According to the calculated main scanning registration error and the sub-scanning registration error, the main scan delay amount and the sub-scan delay amount are set and sent to the LD controllers 106, 107, 108, and 109.

The main scanning scaling error can also be corrected by changing the angle to mount the light emitting element arrays 9K to 9Y. If light emitting element arrays having different lengths are mounted, because each main scanning scale is different, the mounting angle of the light emitting element arrays 9K to 9Y is adjusted to correct the scaling error and a correction to make the length of the light emitting element arrays 9K to 9Y identical in the main scanning direction performed. In this correction, the main scanning scale of the shortest light emitting element array is obtained, and other light emitting element arrays are so slanted so as to coincide with the main scanning scale of the shortest one. In addition, the length in the main scanning direction is obtained from a sheet size to be printed, and the inclination of the light emitting element arrays are changed so as to coincide with the obtained length.

In a case of correcting the angle of the light emitting element arrays, the inclination angle ΔH can be obtained by the following formula (1):

$$\Delta H = \sqrt{(L+\Delta L)2 - L2} \qquad (1)$$

in which L is a target main scanning scale and ΔL is the main scanning scaling error. The thus-obtained inclination angle ΔH is used later to calculate a correction amount of the printing skew error and therefore is stored in the RAM 111.

The main scanning scaling error is properly corrected by a pixel clock frequency generated inside the writing controller 101. For that purpose, a clock generator that can set the frequency very minutely, such as a Voltage Controlled Oscillator (VCO), is used.

If the main scanning color shift is to be corrected, the main scanning scale and the main scanning writing start timing are corrected.

In the main scanning scale correction, the writing controller 101 changes the pixel clock frequency based on the detected scaling error amount of each color. Specifically, if the three feature values of the main scanning registration error, the sub-scanning registration error, and the main scanning scaling error are properly corrected, the relative positions of the leading end area W-Y and the one-side area W-X in the output image are correctly output. According to the calculated main scanning registration error and the sub-scanning registration error, the main scan delay amount and the sub-scan delay amount are set and sent to the LD controllers 106, 107, 108, and 109. The main scanning scaling error is properly corrected by a pixel clock frequency generated inside the writing controller 101. For that purpose, a clock generator that can set the frequency very minutely, such as Voltage Controlled Oscillator (VCO), is used.

If the main scanning color shift is to be corrected, the main scanning scale and the main scanning writing start timing are corrected. In the main scanning scale correction, the writing controller 101 changes the pixel clock frequency based on the detected scaling error amount of each color.

Further, transfer positions of each KMCY-color image processing units 1K, 1M, 1C, and 1Y to the intermediate transfer belt 3 are different, errors may occur in the positional relation in the sub-scanning direction. The relative positions in the sub-scanning direction are called a printing skew error amount. Accordingly, if the printing skew error amount is properly corrected, in addition to the positions W, X and Y, the Z position is also corrected and the proper relative positions of an entire area in the output image can be output.

A printing skew error amount calculation will now be described in detail. As illustrated in FIG. 7, three groups of positional error correction patterns 14 are respectively formed on the intermediate transfer belt 3 at positions where the left-side pattern detection sensor 15, the right-side pattern detection sensor 16, and the central pattern detection sensor 17 pass through (that is, the right and left sides and the central position). Patterns K11, C11, M11, Y11, K12, C12, M12, and Y12 are formed at positions where the L-side pattern detection sensor 15 passes through, patterns K21, C21, M21, Y21, K22, C22, M22, and Y22 are formed at positions where the R-side pattern detection sensor 16 passes through, and patterns K31, C31, M31, Y31, K32, C32, M32, and Y32 are formed at positions where the central pattern detection sensor 17 passes through. Herein, the L-side means the left side and the R-side means the right side in FIG. 7.

The L-side pattern detection sensor 15 detects positions of L-side patterns K11 and C11 and, from its positional relation, calculates an L-side distance KC_L between the K-color and the C-color. On the other hand, the R-side pattern detection sensor 16 detects positions of R-side patterns K21 and C21 and, from its positional relation, calculates a R-side distance KC_R between the K-color and the C-color. Here, a skew amount KC_Skew of the C-color with reference to K-color is obtained from the following formula (2):

$$KC\_Skew = KC\_R - KC\_L \quad (2)$$

In addition, as to M-color and Y-color, from the pattern detection, each skew amount KM_Skew and KY_Skew can be obtained from formulae (3) and (4), respectively.

$$KM\_Skew = KM\_R - KM\_L \quad (3)$$

$$KY\_Skew = KY\_R - KY\_L \quad (4)$$

From the formulae (2) to (4), the C-color skew amount KC_Skew, the M-color skew amount KM_Skew, and the Y-color skew amount KY_Skew with reference to the K-color can be obtained.

As described above, the image signal is stored in the line memory to perform image correction based on the obtained skew amount. After the image signal having been stored in the line memory, the image signal which is subjected to the printing skew error amount correction is sent to the light emitting element array 9 and written on the photoreceptor, and the image of which printing skew error amount has been corrected is formed.

Figures 1, 8:
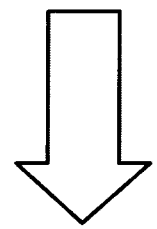
Figure 8:
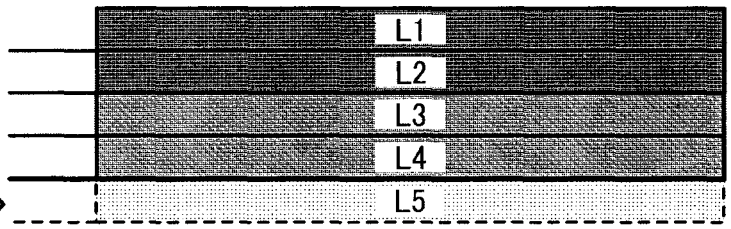
Figure 2:
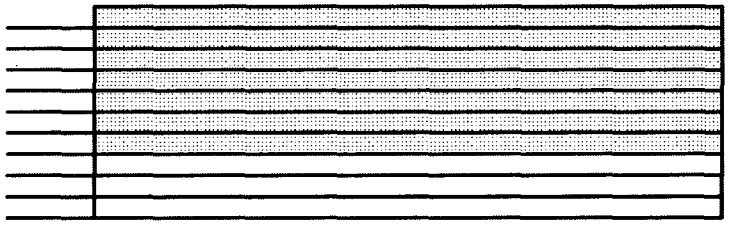

Storing the image signal into the line memory before the printing skew error correction will now be described in detail. FIG. 8-1 shows a line memory storage when the skew amount is within a correctable range according to an embodiment of the present invention. Further, FIG. 8-1 shows a line memory storage when the skew amount is beyond the correctable range according to an embodiment of the present invention. Herein, the correctable range is a skew-correctable limit value determined by a predetermined capacity of the line memory. Accordingly, when the angle adjustment of the light emitting element arrays 9Y to 9K is performed, deviations occur in the sub-scanning direction, but the angle adjustment needs to be performed so that the necessary printing skew error correction amount falls within the limit value. If the correctable range is set to m, when shifting the image to correct the skew amount, at least 1-dot line needs to be overlapped in the main scanning direction. Accordingly, the correctable range can be obtained by the following formula (5).

$$m = l - 1 [dot] \quad (5)$$

wherein l is a number of lines of the line memories.

The formula (5) is used to calculate a correctable number of dots from the line number of the line memories. If the number of lines of the line memories is 4, up to three lines are a correctable range. When the output resolution is 600 dpi, the correctable range becomes 127 µm if converted into distance.

In the case of FIG. 8-1, the line number of the line memories necessary for image correction is 2 lines. Therefore, the skew correction amount is below the correctable range and is stored in the line memories as conventionally. On the other hand, in the case of FIG. 8-2, the line number of the line memories necessary for image correction is 5 lines. Because the skew correction amount exceeds the correctable range, the capacity of the line memories is insufficient. Then, after the image signal reducing process is performed so that the line memories of more than the necessary 5 lines can be secured, the skew correction amount is stored in the line memories.

Figure 9:
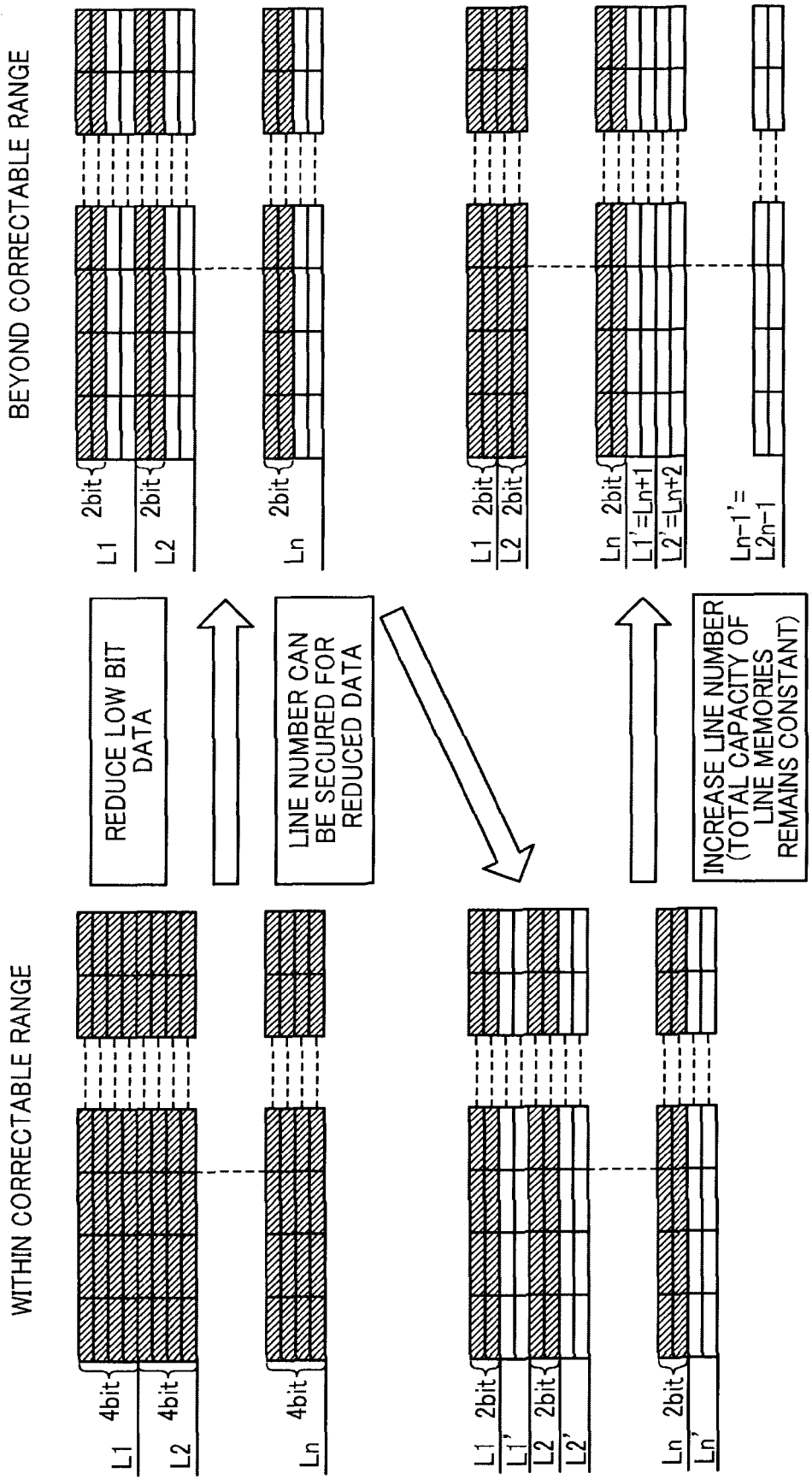
FIG. 9 is a view illustrating a memory structure in which reduction of the number of gradation levels can be achieved.

The image reduction process will now be described in detail. FIG. 9 is a view illustrating a memory structure in which reduction of the number of gradation levels can be achieved according to an embodiment of the present invention. In the present embodiment, by performing an image reduction process to decrease the number of gradation levels, without increasing the capacity of the line memories, a practical correction area of the image can be expanded, and as a result, the skew amount correction area can be expanded. If the skew amount is within the correctable range, assuming that the gradation levels of the image signal is 4 bits, the 4-bit image signal is stored in the line memories L1, L2, ..., Ln. If the skew amount is beyond the correctable range, the number of gradation levels of the image signal is reduced from 4 bits to 2 bits, and the 2-bit image signal is stored in the line memories L1, L2, ..., Ln. Accordingly, because the memory capacity for each line is reduced by half, compared to the case in which the skew amount is within the correctable range, the line memory structure with double the number of lines can be achieved. As a result, the correction range of the skew amount can be doubled.

Figure 10A:
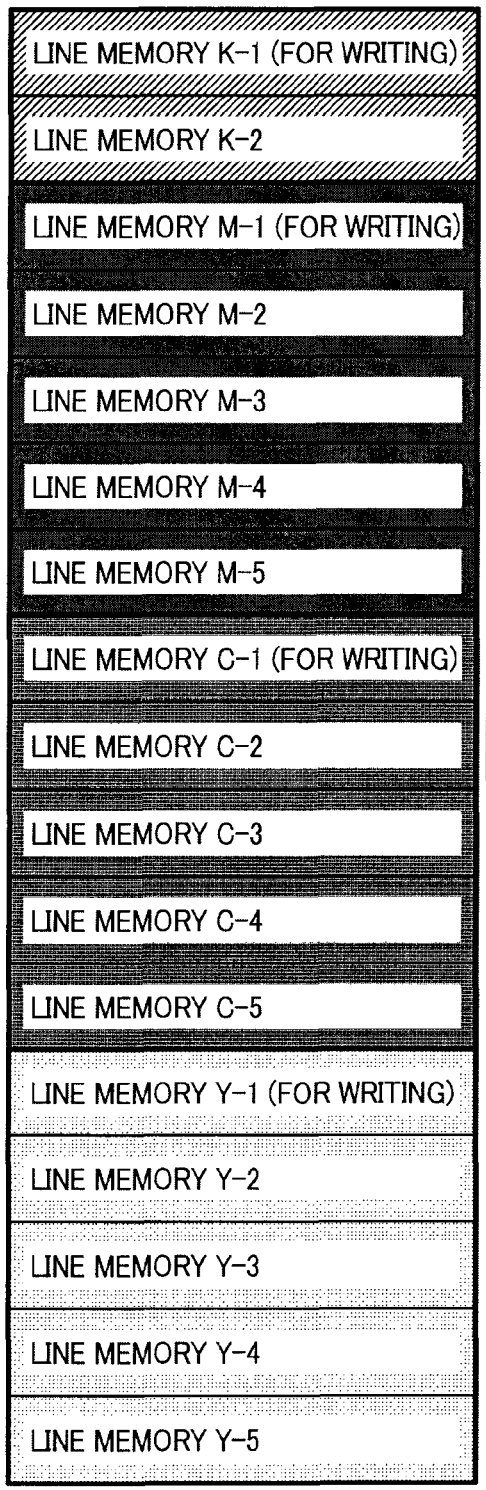
FIGS. 10A and 10B each are views illustrating an example of a line memory structure.
Figure 10B:
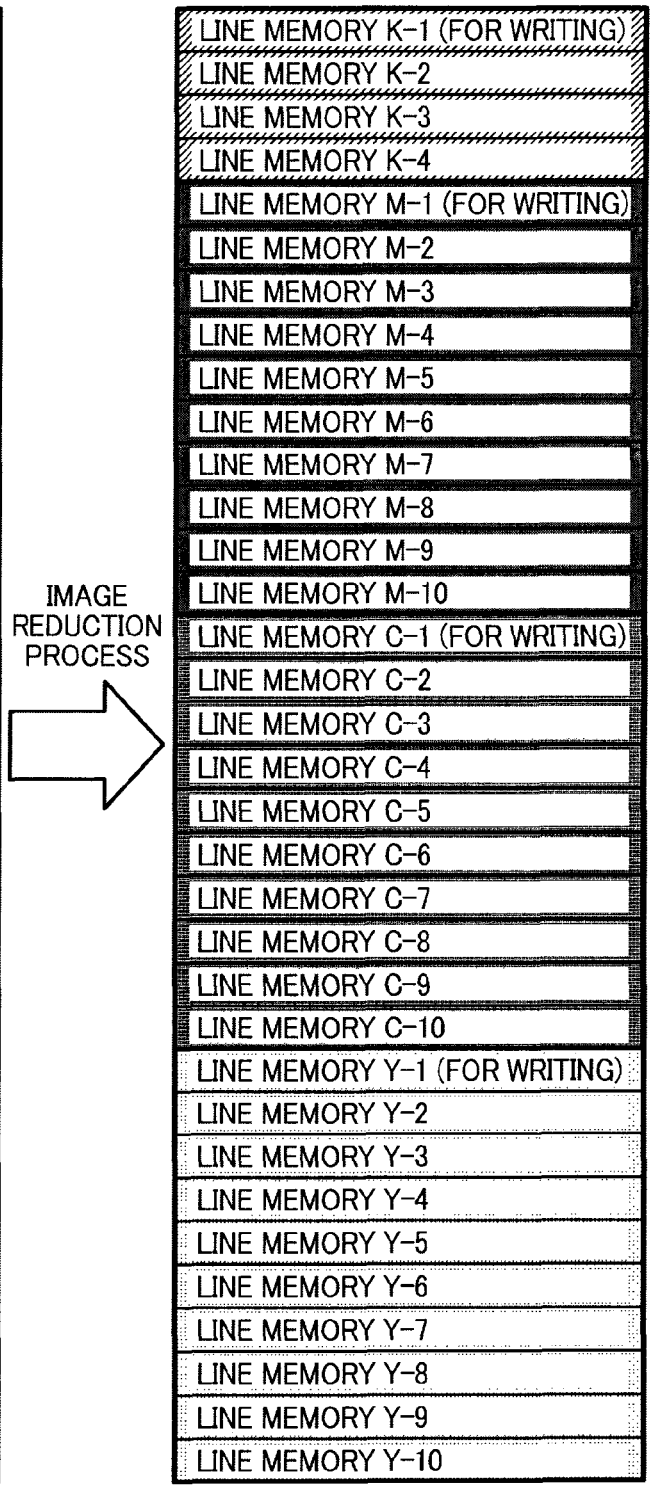

A structure of the line memory will now be described in detail. After the image reduction process has been performed, the reduced image signal is stored in the line memories 120, 121, 122, and 123 for respective colors of KMCY. FIGS. 10A and 10B each are views illustrating an example of a line memory structure according to an embodiment of the present invention. As illustrated in FIG. 10A, in the case of the skew amount being within the correctable range, the line memory 120 for black, the line memory 121 for magenta, the line memory 122 for cyan, and the line memory 123 for yellow are formed of 2 lines, 5 lines, 5 lines, and 5 lines, respectively. However, when the skew correction amount of each color exceeds the correctable rage, as illustrated in FIG. 10B, the image reduction process is executed. As a result, the number of line memories for each color is doubled, respectively, to 4 lines, 10 lines, 10 lines, and 10 lines. Thus, after the image data has been stored in the line memories, the skew amount correction is executed.

A skew correction amount will now be described in detail. Table 1 shows an example of the calculated skew amounts. Each sign before the number shows an arbitrary definable shift direction in the sub-scanning direction. In the embodiment of the present invention, a leading end of the image formation, that is, an upper side in the figure is defined as a plus (+) direction.

TABLE 1

| Color | Skew Amount |
|---|---|
| M-skew amount (µm) | +110 |
| C-skew amount (µm) | +130 |
| Y-skew amount (µm) | −30 |

In this case, assuming that the output resolution is 600 dpi, one line of 600 dpi is defined as a minimum correction unit. Accordingly, by dividing the skew amount with the minimum correction unit, the skew correction amount obtained is as shown in Table 2.

TABLE 2

| Color | Skew Correction Amount |
| --- | --- |
| M-skew correction amount (dot) | +2.6 |
| C-skew correction amount (dot) | +3.1 |
| Y-skew correction amount (dot) | −0.7 |

Because one line of 600 dpi is the minimum correction unit, the number after the decimal point as represented in Table 1 cannot be corrected and is replaced with an integer by rounding up or down. If the round-off is applied for example, the final skew correction amounts will be as shown in Table 3.

TABLE 3

| Color | Skew Correction Amount |
| --- | --- |
| M-skew correction amount (dot) | +3 |
| C-skew correction amount (dot) | +3 |
| Y-skew correction amount (dot) | −1 |

The skew correction amount as shown in Table 3 is calculated by each input image controller 137, 138, and 139 as illustrated in FIG. 5, and is stored in the RAM 111.

Figures 2A, 11:
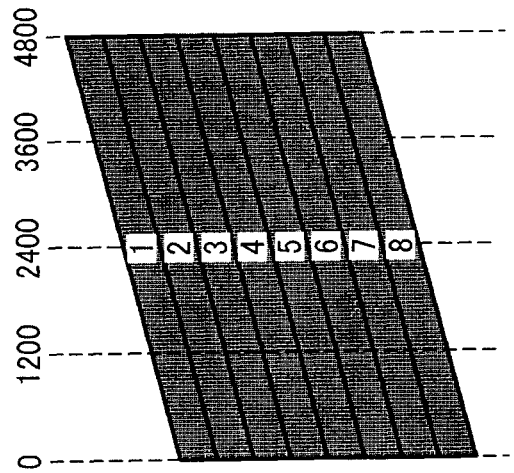

Image correction corresponding to the calculated skew correction amount will now be described. FIGS. 11-1A to 11-1C each show a skew correction when the skew correction amount is one dot according to an embodiment of the present invention. FIG. 11-1A shows a state in which one line skew sloping downward occurs on the intermediate transfer belt 3. FIG. 11-1B shows a state in which image signals including 4800 pixels in the main scanning direction are divided into two in the main scanning direction. In this case, if a start point of the main scanning direction is defined as a left end and an upper side of the shift direction of the image in the sub-scanning direction is defined as plus (+), the skew correction amounts corresponding to the division positions at 2400 pixels and 4800 pixels are 0 and +1, respectively. FIG. 11-1C shows the skew correction amounts as a result of image correction. Specifically, FIG. 11-1C shows a state in which the image is corrected by shifting one pixel upward in the sub-scanning direction.

Figures 2B, 11:
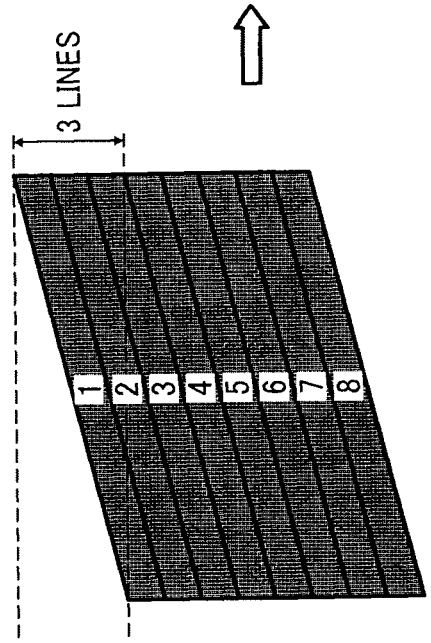
Figures 2C, 11:
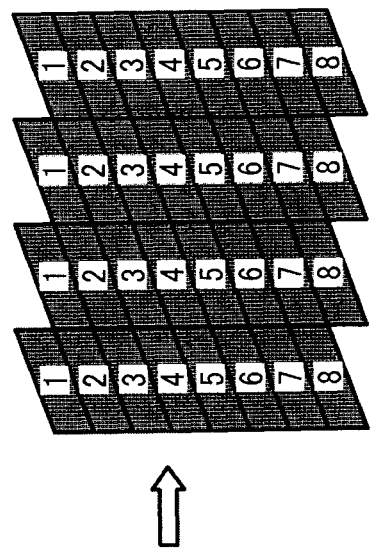

On the other hand, FIGS. 11-2A to 11-2C show a skew correction when the skew correction amount is 3 dots according to an embodiment of the present invention. FIG. 11-1A shows a state in which three-line skew sloping upward occurs on the intermediate transfer belt 3. FIG. 11-2B shows a state in which image signals including 4800 pixels in the main scanning direction are divided into four in the main scanning direction. In this case, the skew correction amounts corresponding to the division positions at 1200 pixels, 2400 pixels, 3600 pixels, and 4800 pixels are 0, −1, −2, and −3, respectively. FIG. 11-2C shows the skew correction amounts as a result of image correction. Specifically, FIG. 11-2C shows a state in which the image is corrected by shifting in the sub-scanning direction.

A series of operations from pattern formation to skew correction amount calculation will now be described.

Figure 12:
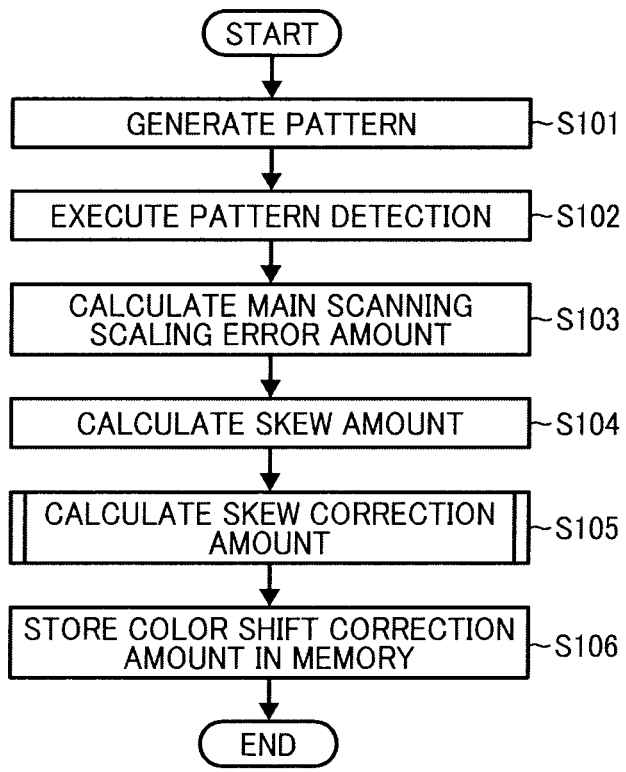
FIG. 12 is a flowchart for calculating a positional error correction amount.

FIG. 12 is a flowchart for calculating a positional error correction amount according to an embodiment of the present invention. First, a positional error correction pattern 14 is formed on the intermediate transfer belt 3 in step S101. The left-side pattern detection sensor 15 and the right-side pattern detection sensor 16 execute a pattern detection in step S102. The correction amount of each of the main scanning registration, the sub-scanning registration for each of the colors of KMCY, and the main scanning scale is calculated in step S103. The correction amount of the main scanning scale includes calculation of the sloped amount of the light emitting element arrays. Next, skew amounts of M-color, C-color, and Y-color with reference to the K-color are calculated in step S104. Then, the skew correction amounts of M-color, C-color, and Y-color are obtained in step S105. The calculation of the skew correction amount in step S105 includes, in addition to the values obtained from the pattern detection, effects of the inclination angle ΔH of the light emitting element arrays adjusted for correcting the main scanning scale errors. The calculated positional error correction amounts of each color (that is, each correction amount of the main scanning registration, the sub-scanning registration, the main scanning scale, and the skew amount) are stored in the RAM 111 in step S106.

Figure 13:
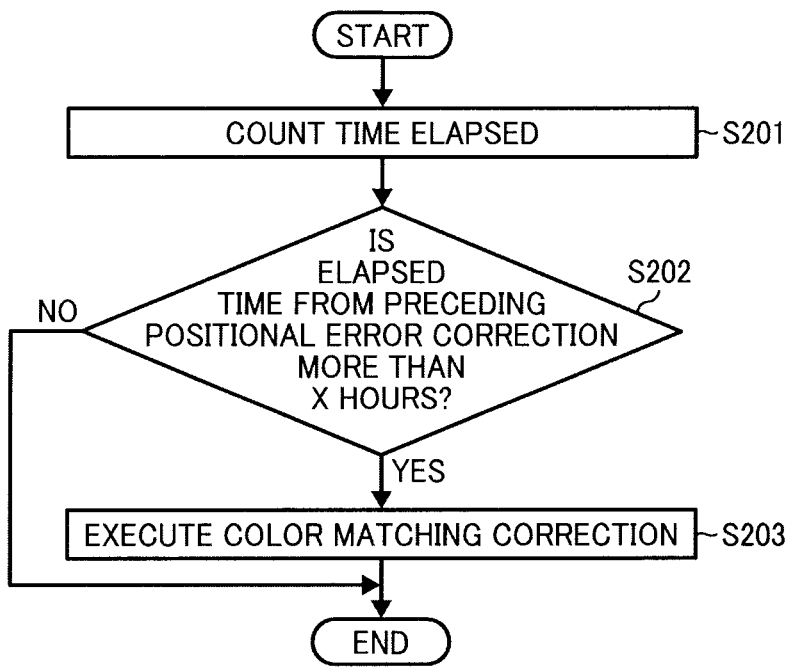
FIG. 13 is a flowchart for a process of correcting a main scanning scaling error.

Correction is in general executed at a time of printing based on the correction amount calculated as described in the flowchart to show the color shift correction amount calculation. However, because, even when printing is not performed, correction by the adjustment of the inclination angle of the light emitting element arrays is executable, a flow of executing the correction will now be described. FIG. 13 is a flowchart for executing a color matching correction. As illustrated in FIG. 13, the positional error correction processors 124 to 127 each include a built-in counter to count a time and the elapsed time is counted in step S201. The positional error correction processors 124 to 127 each determine whether or not the elapsed time after the previous positional error correction has exceeded X hours in step S202. If it is determined that the elapsed time has exceeded X hours, each inclination angle of the light emitting element arrays 9K to 9Y is adjusted based on the correction amount of the main scanning scale calculated by the aforementioned correction amount calculation process in step S203. If it is determined that the elapsed time has not exceeded X hours, the process is terminated.

In the image forming apparatus 100 according to an embodiment of the present invention, because the main scanning scale can be corrected by changing the mounting angle of each of the light emitting element arrays 9K to 9Y, the main scanning scale can be corrected mechanically even though the printing operation is not being performed. Therefore, because the correction need not be performed digitally each time the printing is performed, a process load for the positional error correction may be reduced.

If the light emitting element arrays 9K to 9Y with different lengths are mounted, because each main scanning scale can be made identical, the light emitting element arrays 9K to 9Y each having a different length can be replaced separately, thereby simplifying control and maintenance.

Further, because the action part 21 to automatically adjust an inclination of the light emitting element arrays 9K to 9Y is provided, there is no need of performing maintenance manually, thereby reducing the maintenance burden.

When the light emitting element arrays 9K to 9Y are inclined to correct the main scanning scaling error, the deviation of the skew occurs. However, because the skew is corrected at a time of printing after the light emitting element arrays 9K to 9Y have been inclined, the deviation of the skew can be eliminated.

Figure 14:
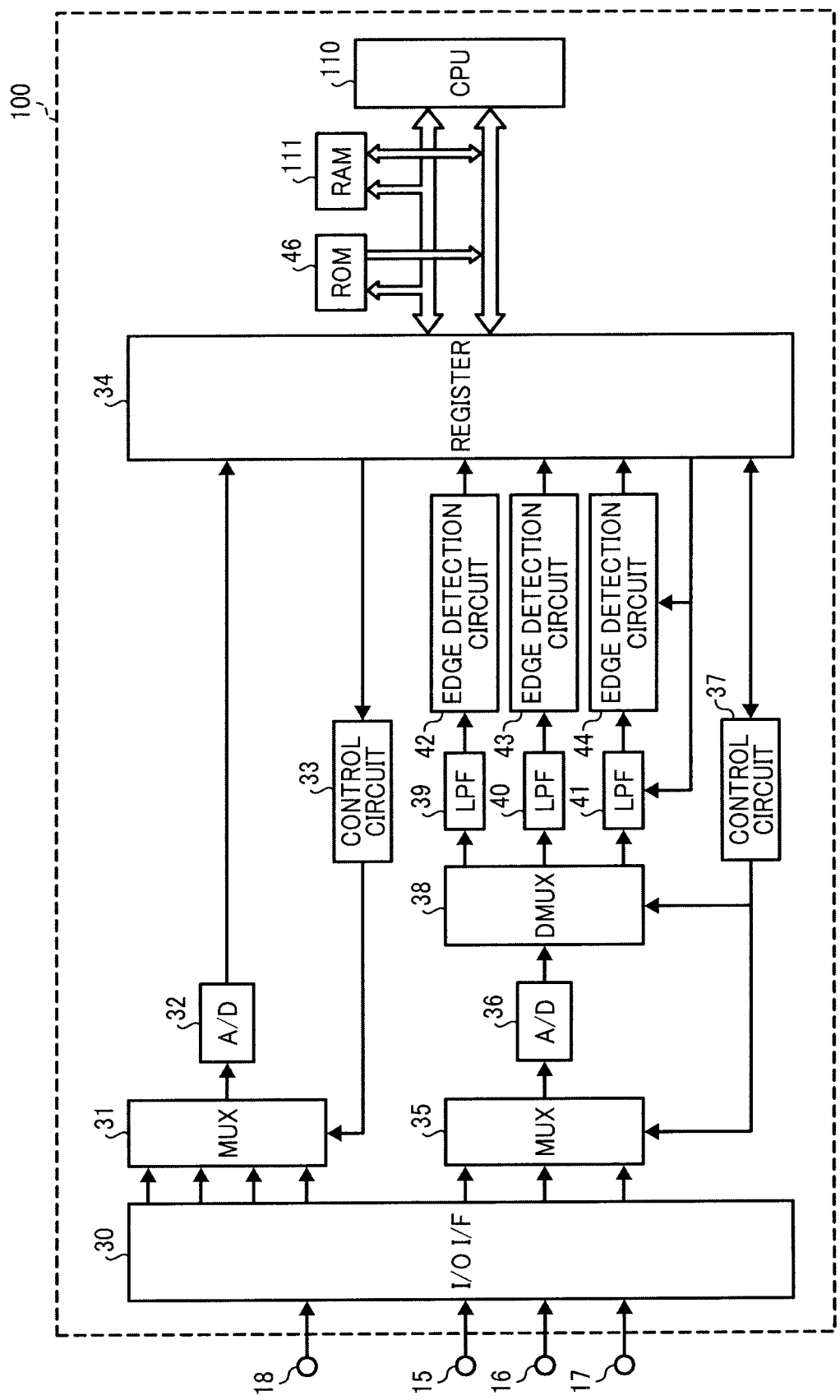
FIG. 14 is a block diagram illustrating a hardware structure of the image forming apparatus.

FIG. 14 is a block diagram illustrating a hardware structure of the image forming apparatus 100. The image forming apparatus 100 includes an I/O interface 30, multiplexers 31 and 35, A/D converters 32 and 36, control circuits 33 and 37, a register 34, a demultiplexer 38, LPF circuits (digital filter circuits or product-sum operation circuits) 39 to 41, edge detection circuits 42 to 44, a CPU 110, a RAM 111, and a ROM 46. Detection signals from the pattern detection sensors 15 to 17 or from the process control pattern detection sensor 18 are input to the multiplexer 31 via the I/O interface 30.

Upon receipt of the detection signal from the process control pattern detection sensor 18, the control circuit 33 controls the multiplexer 31 to perform selection of the channel of the sensor during the detection pattern formation and the A/D converter 32 to perform A/D conversion operation, and the digitized data is stored in the register 34. The CPU 110 changes settings for the process control in charging, developing, and transferring via the obtained data.

The control circuit 37 controls the multiplexer 35 to perform selection of the channel of the sensor during the detection pattern formation and the A/D converter 36 to perform A/D conversion operation, and the digitized data is stored in the demultiplexer 38. The demultiplexer 38 selects either one of the LPF circuits 39 to 41 to which the converted digital data is to be output. The LPF circuits 39 to 41 trim high frequency components of the received data so that the downstream circuit can correctly recognize the pattern position.

The edge detection circuits 42 to 44 positioned downstream of the LPF circuits 39 to 41 compare the detected voltage waveform with a predetermined threshold voltage, extract falling and rising points, recognize a pattern center position being a center of the falling and rising points, and store the center value in the register 34.

The CPU 110 performs calculations to change the process conditions and positional error correction based on the data stored in the register 34 according to a program stored in the ROM 46. The calculation result is stored in the RAM 111. The CPU 110 changes each set value stored in the register 34 so that the operation of sampling start or stop is switched, the channel of each sensor performing A/D conversion is switched, the trimmed frequency of the LPF circuits 39 to 41 is changed, and the threshold voltage of the edge detection circuits 42 to 44 is changed.

Meanwhile, the program to be executed by the image forming apparatus 100 according to the embodiment of the present invention is previously stored in, for example, the ROM. The program to be executed by the image forming apparatus 100 can also be stored in the computer readable recording medium such as a CD-ROM, a flexible disk (FD), CD-rewritable, and a Digital Versatile Disc (DVD) in the installable format or the executable format.

In the step S105 as illustrated in FIG. 12, the values for angle adjustment of the light emitting element arrays 9Y to 9K are stored and the stored values are used for the calculation of the correction amount of the printing skew errors. However, the correction amount of the printing skew errors can be calculated by performing pattern formation again after the angle adjustment of the light emitting element arrays 9Y to 9K.

An example in which the image forming apparatus 100 of the present invention is applied to the color copier has been described heretofore. However, the present invention may be applied to any multifunctional apparatus including at least two capabilities of copying function, printing function, scanning function, and facsimile function, a printer, a scanner, a facsimile machine, and the like.

Additional modifications and variations of the present invention are possible in light of the above teachings. It is therefore to be understood that, within the scope of the appended claims, the invention may be practiced other than as specifically described herein.

What is claimed is:

1. An image forming apparatus comprising:
    photoreceptors;
    an image carrier;
    a plurality of light emitting element arrays each to emit a light beam onto a corresponding one of the photoreceptors independently;
    an angle adjuster to adjust a mounting angle of the light emitting element arrays relative to a frame of the image forming apparatus;
    a pattern forming unit to form a positional error correction pattern of each color on the image carrier;
    an optical detector to detect the correction pattern formed on the image carrier;
    a positional error calculator to calculate a printing skew error and a main scanning scaling error of the light emitting element arrays based on the correction pattern detected by the optical detector;
    a skew corrector to correct the printing skew error calculated by the positional error calculator after adjustment of the mounting angle of the light emitting element arrays by the angle adjuster; and
    a main scanning scaling error corrector to correct the main scanning scaling error by changing the mounting angle of the light emitting element arrays in the main scanning direction using the angle adjuster based on the main scanning scaling error.

2. An image forming apparatus as claimed in claim 1, wherein the main scanning scaling error corrector changes a mounting angle of the light emitting element arrays such that a shortest main scanning length of the light emitting element array becomes equal to the main scanning length of other light emitting element arrays.

3. An image forming apparatus as claimed in claim 1, wherein the main scanning scaling error corrector changes a mounting angle of each of the light emitting element arrays so that a length of a sheet in the main scanning direction when a printable maximum-sized sheet is conveyed becomes identical to a main scanning length of the light emitting element arrays.

4. An image forming apparatus as claimed in claim 1, wherein the main scanning scaling error corrector corrects the main scanning scaling error each time a predetermined time has elapsed after the previous positional error correction by the main scanning scaling error corrector.

5. An image forming apparatus, comprising:
    photoreceptors;
    an image carrier;
    a plurality of adjustable light emitting element arrays to independently emit light onto a corresponding one of the photoreceptors;
    an optical detector to detect a correction pattern on the image carrier;
    processing circuitry configured to cause the image forming apparatus to:
    form a positional error correction pattern of each color on the image carrier;
    calculate a printing skew error and a main scanning scaling error of the light emitting element arrays based on the correction pattern detected by the optical detector;
    correct the printing skew error which has been calculated after adjustment of mounting angles of the light emitting element arrays relative to a frame of the image forming apparatus; and
    correct the main scanning scaling error by changing the mounting angle of the light emitting element arrays in the main scanning direction based on the main scanning scaling error.

* * * * *